(12) United States Patent
Clark et al.

(10) Patent No.: US 9,133,971 B2
(45) Date of Patent: Sep. 15, 2015

(54) SOLAR PANEL AND METHOD FOR HEATING POOLS AND SPAS

(76) Inventors: Reuben Clark, Raleigh, NC (US); Gary K. Weise, San Juan Capistrano, CA (US)

(*) Notice: Subject to any disclaimer, the term of this patent is extended or adjusted under 35 U.S.C. 154(b) by 760 days.

(21) Appl. No.: 13/397,986

(22) Filed: Feb. 16, 2012

(65) Prior Publication Data
US 2012/0145142 A1    Jun. 14, 2012

Related U.S. Application Data

(63) Continuation-in-part of application No. 12/386,236, filed on Apr. 15, 2009, now abandoned, and a continuation-in-part of application No. 11/901,024, filed on Sep. 14, 2007, now Pat. No. 8,141,910, and a continuation-in-part of application No. 10/979,444, filed on Nov. 1, 2004, now abandoned.

(51) Int. Cl.
| | |
|---|---|
| *F24J 2/24* | (2006.01) |
| *F16L 47/32* | (2006.01) |
| *F16L 41/08* | (2006.01) |
| *F24J 2/26* | (2006.01) |
| *F24J 2/46* | (2006.01) |

(52) U.S. Cl.
CPC ............... *F16L 47/32* (2013.01); *F16L 41/08* (2013.01); *F24J 2/243* (2013.01); *F24J 2/265* (2013.01); *F24J 2/4647* (2013.01); *Y02B 10/20* (2013.01); *Y02E 10/44* (2013.01); *Y10T 29/49355* (2015.01)

(58) Field of Classification Search
CPC .......... F24J 2/243; F24J 2/4647; F24J 2/5243
USPC ........... 126/651, 655, 663–673; 165/171, 173
See application file for complete search history.

(56) References Cited

U.S. PATENT DOCUMENTS

| | | | | |
|---|---|---|---|---|
| 1,208,049 A | * | 12/1916 | Tillman | 138/37 |
| 4,114,597 A | * | 9/1978 | Erb | 126/665 |
| 4,136,272 A | * | 1/1979 | Rudd | 219/107 |
| 4,174,703 A | * | 11/1979 | Blakey et al. | 126/632 |
| 4,178,914 A | * | 12/1979 | Erb | 126/674 |
| 4,213,450 A | * | 7/1980 | Perez | 126/663 |
| 4,217,887 A | * | 8/1980 | Hoffman et al. | 126/664 |
| 4,265,225 A | * | 5/1981 | Berger et al. | 126/669 |
| 4,300,971 A | * | 11/1981 | McAlister | 156/244.11 |
| 4,324,028 A | * | 4/1982 | Severson | 29/890.033 |
| 4,333,789 A | * | 6/1982 | McAlister | 156/499 |
| 4,340,030 A | * | 7/1982 | Molivadas | 126/635 |
| 4,353,355 A | * | 10/1982 | Stewart | 126/669 |
| 4,382,468 A | * | 5/1983 | Hastwell | 165/173 |

(Continued)

FOREIGN PATENT DOCUMENTS

CA      1110938 A1 * 10/1981

*Primary Examiner* — Jorge Pereiro
(74) *Attorney, Agent, or Firm* — Terry L. Miller

(57) ABSTRACT

An improved low-pressure, water-heating solar panel provides easier and safer initial installation because it is more resistant to damage by workmen during that installation. Further, after installation, the solar panel is more resistant to damage by high winds because it has a low profile and does not present a gap or space into which high winds can intrude to lift, cause flapping of, and damage to the solar panel. Also, during freezing weather the improved solar panel is not damaged by freezing of retained water due to its novel internal construction which allows substantially all water to completely drain from the solar panel and prevents any puddling of retained water. Methods of manufacturing the improved solar panel are disclosed.

9 Claims, 4 Drawing Sheets

(56) References Cited

U.S. PATENT DOCUMENTS

| | | | |
|---|---|---|---|
| 4,709,689 A * | 12/1987 | Simcox | 126/665 |
| 4,832,119 A * | 5/1989 | Bloor et al. | 165/171 |
| 4,962,811 A * | 10/1990 | Yamamoto | 165/173 |
| 5,259,363 A * | 11/1993 | Peacock et al. | 126/621 |
| 6,647,639 B1 * | 11/2003 | Storrer | 34/104 |
| 6,787,116 B2 * | 9/2004 | Williams et al. | 428/36.92 |
| 6,994,117 B2 * | 2/2006 | Flynn et al. | 138/98 |
| 7,112,297 B2 * | 9/2006 | Williams et al. | 264/277 |
| 8,141,910 B2 * | 3/2012 | Weise et al. | 285/133.3 |
| 2002/0162222 A1 * | 11/2002 | Williams et al. | 29/890.03 |
| 2004/0081777 A1 * | 4/2004 | Williams et al. | 428/34.1 |
| 2005/0011575 A1 * | 1/2005 | Headley | 138/177 |
| 2005/0012334 A1 * | 1/2005 | Headley | 285/390 |

\* cited by examiner

SOLAR PANEL AND METHOD FOR HEATING POOLS AND SPAS

CROSS REFERENCE TO RELATED APPLICATION

This application is a Continuation-in-Part of U.S. patent application Ser. No. 12/386,236, filed 15 Apr. 2009 (Abandoned); and is also a Continuation-in-Part of U.S. patent application Ser. No. 11/901,024, filed 14 Sep. 2007, now U.S. Pat. No. 8,141,910, issued 27 Mar. 2012; and is also a Continuation-in-Part of U.S. patent application Ser. No. 10/979,444, filed 1 Nov. 2004 (Abandoned), the disclosures of which are incorporated herein by reference to the extent necessary for a complete and enabling disclosure of the present invention.

BACKGROUND OF THE INVENTION

The present invention relates generally to a solar panel for heating the water of a swimming pool or spa, although the invention is not so limited. Some conventional solar panels of this type are generally referred to as being of "mat" or "web" construction or type, because they include a generally flat or blanket-like mat or web of plural relatively small, elongate parallel tubes or conduits. These small tubes of the mat are united by a diaphragm or web of material, and serve as solar heating collectors. As explained, the plurality of small tubes may be united into a unity or into groups, in side-by-side parallel array by a comparatively thin web of material. Further, the web or mat of plural small tubes are terminated at each of their opposite ends in water flow communication with a respective one of a pair of larger manifold conduits. The pair of larger manifold conduits generally extend perpendicularly to the small solar collector tubes of the mat. Particularly, such low-pressure, water-heating solar panels of this type are used to circulate water from a pool or spa under relatively low pressure (perhaps provided by a pool pump, or by a solar heating pump—which may be line powered or even may be powered by solar electric panels) in heat absorbing relation with solar radiation (i.e., the solar panel is exposed to the sun). For this purpose, such solar panels are generally installed adjacent to, or on the a roof perhaps, of a residence or other building having an associated pool which it is desired to heat. By the use of such solar pool and spa heating, the use of natural gas and other fossil fuels for pool and spa heating is eliminated or greatly reduced. Also, the swimming season for the pool and/or spa is greatly extended in both the spring and the fall in areas where such a pool or spa may otherwise be usable (with comfortably warm water temperatures) only during a comparatively short mid-summer part of each year.

Conventional low-pressure solar panels of this type include the mat structure of plural relatively small parallel tubes or conduits, and respective opposite manifold tubes or conduits of a size considerably larger than the mat tubes. During manufacture of such mat type solar panels, a number of alternative manufacturing expedients may be utilized. One such manufacturing expedient is to extrude the tubes of the mat, along with an interconnecting web or diaphragm, as a long extrudate (i.e., an elongate article made by extrusion of molten plastic through a profiled die followed by cooling of the plastic) provided in rolls for installation. The manifold tubes are then provided with a parallel plurality of outwardly projecting hose barbs or nipples, to which the mat is connected after being cut to the desired length. That is, each of the plural small tubes of the mat are individually fitted over a respective hose barb or nipple at the manifolds in order to connect the manifolds and mat. This fitting job is generally done by an installation technician, who also completes the remainder of the solar panel installation. This version of mat type solar panel is very labor intensive to install, although it has found some favor with certain "do it yourself" home owners.

Another form of such a mat configuration of low-pressure water-heating solar panel takes the form of a mat of plural tubes which is either solvent welded, or ultrasonically welded, or over-cast permanently into flow communication with a pair of manifold tubes.

In each of the conventional mat type of low-pressure, water-heating solar panels discussed above, the mat of plural tubes intersects the manifold tubes in alignment with the longitudinal axis of the manifold tubes. As will be seen, this construction has a serious disadvantage, especially in parts of the country where freezing temperatures are experienced during winter.

Consideration of how such mat type of low-pressure, water-heating solar panels are installed and used will reveal that such panels are generally held on a frame, perhaps mounted to a roof, and have the manifold tubes disposed generally horizontally, with the plural tubes of the mat extending generally vertically. In this orientation, low-pressure water from a pool or spa is pumped to the panel along one of the manifold tubes, flows along the plural relatively small tubes of the mat in heat absorbing relation with sun light, and is collected at the other manifold tube. During warm weather conditions, this scheme of operation works well. However, in areas which experience freezing temperatures, the solar panel must be drained in order to prevent freezing water within the panel from destroying the panel structure. To this end, many solar panel installations include a vacuum breaker valve which is temperature responsive so as to open and allow draining of water from within the solar panel in the event the ambient temperature drops close to freezing, to about 34° F., for example. In this way, it is sought to safeguard the solar panel from damage by water freezing within the panel. As will be seen, these efforts are somewhat ineffective with conventional solar panel designs.

A common problem resulting from the imperfect design of conventional solar panels of the type discussed above is that not all water is able to drain from the panel. That is, a puddle of water remains in the panel after draining, and may freeze to damage the solar panel. Such is the case because water may be trapped in one of both of the manifold tubes, and be unable to drain from the panel.

Turning now to consideration of the appended drawing Figure indicated as "prior art," (i.e., FIG. 8) it will be understood by those ordinarily skilled in the pertinent arts that a conventional mat type of solar panel 10 is generally of rectangular or rectilinear shape in plan view (the plan view not being seen in FIG. 8—but being similar to that seen in diagrammatic FIG. 1), and is attached in an angled orientation to a support surface, which may be provided by a support rack or roof, generally indicated with the numeral 12. This angulated orientation of the conventional solar panel both improves the presentation of the solar panel absorbing area to the sun, and is thought to effect draining of the solar panel when it is desired to protect the panel from freezing conditions. Consideration of the construction of the conventional solar panel 10 (seen in side elevation cross sectional view in FIG. 8) will show that it includes an elongate "mat" or "web" section 14 consisting of plural side-by-side relatively small solar collector tubes 16 (only the closest one of these tubes being visible to the viewer of the "prior art" FIG. 7, as this Figure is seen in cross section of a side elevation view). The tubes 16 are generally formed as part of an elongate plastic or polymer extrudate, including a relatively thin interconnecting web or diaphragm portion, indicated with the numeral 18. At the upper and lower ends of the mat 14, the plural tubes 16 are each connected in flow communication with a respective manifold tube 20, 22 (i.e., with flow passages 20a and 22a, respectively) of a size considerably larger than the small tubes of the mat 14. The small tubes 16 and the manifold tubes 20, 22 intersect or interconnect along lines intersecting the centerlines of the small tubes 16 and the centerlines of the larger manifold tubes 20, 22.

Consequently, when the solar panel 10 is supported on a flat (and perhaps angled as shown) surface, then the mat 14 of the solar panel 10 spans between the manifold tubes 20, 22 above the surface 12, defining a gap, indicated with the numeral 24. Actually, because the mat 14 is made of a somewhat flexible plastic material, this mat may sag somewhat between the manifold tubes 20 and 22, so that over a central part of its length it is somewhat slack and rests upon the surface 12, except adjacent to the manifold tubes 20 and 22. This flexibility, slack, and sagging of the conventional solar panels has another undesired result, which is further explained below. Consequently, as is seen in the upper part of the "prior art" Figure, when the solar panel 10 is drained, a puddle of water still remains in the upper manifold tube 20. This puddle of water may be sufficient that water not drained from the solar panel intrudes into fissures and cracks of the solar panel structure. Perhaps these fissures and cracks would not otherwise cause a problem, but over time as these fissures and cracks of the solar panel are widened and weakened by repeated cycles of water freezing and expanding in them, they can lead to leaks of the solar panel. In fact, such leaks of this type of solar panel in areas experiencing freezing temperatures are a leading cause of warranty claims, customer dissatisfaction, and complaints against this type of solar panel.

As can be seen, there is a need for an improved low-pressure, water-heating solar panel that will drain completely so as not to retain water that may freeze within the panel.

Also, there is a need for an improved low-pressure, water-heating solar panel that may more easily be installed on a rack or on a roof, for example, in order to better support the solar panel and to protect it from severe weather conditions, such as high winds. As can be seen from the "prior art" FIG. 8, conventional solar panels of this type inherently do not fit closely to the rack or roof surface on which they are mounted (i.e., recalling gap 24), and have an additional undesired consequence or disadvantage, which was alluded to above. This disadvantage results from the slack and flexible nature of the solar panel combined with the possibility of wind getting under the panel via gap 24. The gap 24, combined with the slack in and flexibility of the solar panel web presents an opportunity for high winds to lift the web portion of the solar panel. Once the web portion of such a conventional solar panel is lifted by strong winds the solar panel may flap uncontrollably like a flag in a stiff breeze, and the chances of the panel being damaged or destroyed are very great.

SUMMARY OF THE INVENTION

In view of the deficiencies of the conventional technology, an objective for this invention is to reduce or eliminate one or more of these deficiencies.

Accordingly, as realized in one particularly preferred exemplary embodiment, the present invention provides a solar panel formed of plastic material and especially configured for heating water at low pressure when exposed to sun light, the solar panel comprising: a planar flexible mat of plural elongate plastic solar collector tubes each having a coextensive first open end and an opposite coextensive second open end, and the plural elongate plastic tubes being interconnected to form the mat by comparatively thin web members interconnecting each tube to a next-adjacent tube; a pair of manifold tubes each interconnecting in flow communication with the plural elongate plastic tubes of the mat at respective opposite ends of the latter, each of the pair of manifold tubes outwardly defining a boss providing for interconnection of the mat of plural elongate plastic tubes with the respective one of the pair of manifold tubes, and the mat of plural elongate plastic tubes being disposed below a centerline of at least one of the pair of manifold tubes; wherein each of the pair of manifold tubes at the boss thereof includes an integral portion over-molded upon and sealingly engaging with the mat of solar collector tubes.

The low-pressure, water-heating solar panel according to the present invention includes a mat of relatively small tubes communicating at each opposite end with a respective one of a pair of larger manifold tubes. The mat of relatively smaller tubes joins with the larger manifold tubes along a line that is offset from the centerline of the manifold tubes, and which is preferably tangential along an inside wall or passage wall of the manifold tubes. By this expedient, the solar panel provides either no recess or cavity within which water may puddle and not be drained from the solar panel, or a greatly reduced puddle area.

Also, the present inventive solar panel installs at a lower height (or essentially flush) on a roof surface or mounting rack, so that the panel is both protected against damage during installation, and is more resistant to lifting off the rack or roof by high winds.

An advantage of the present invention is the resistance of the inventive solar panel to being broken or being damaged inadvertently during installation or during other work on a mounting rack or roof having the solar panel installed thereon.

Further, another significant advantage derives from the low-profile nature of the present inventive solar panel, in that the panel "hugs" (or is disposed upon or closely adjacent to) the roof or rack to which it is mounted; and presents to ambient winds essentially no gap (recalling gap 24) and a much less accessible surface under which the wind may catch to lift the solar panel off its rack or roof mounting surface. Accordingly, the present solar panel does not flap in the wind as do conventional solar panels.

These and other aspects, objects, features and advantages of the present invention will become clear from a reading of the following detailed description of exemplary preferred embodiments of the invention when considered in conjunction with the accompanying drawings.

BRIEF DESCRIPTION OF THE DRAWING FIGURES

FIG. 1 is a perspective somewhat diagrammatic view of an inventive solar panel embodying this present invention installed on a roof of a residence and in association with a residential swimming pool;

FIG. 2 provides a side elevation view in cross section of the inventive solar panel seen in FIG. 1;

Figure 4:
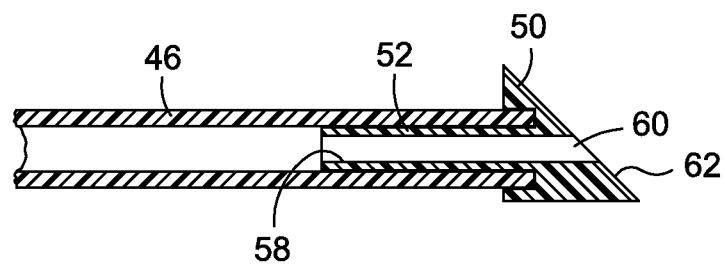
FIG. 4 is a fragmentary side elevation view in cross section of the solar panel components seen in FIGS. 3 and 3A, and illustrates these components following an intermediate manufacturing step.
Figure 6:
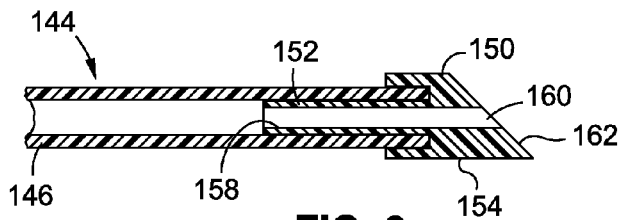

FIG. 6 provides a fragmentary side elevation view in cross section of solar panel components equivalent to those seen in FIG. 4, except that these components are for an alternative embodiment of the inventive solar panel.

Figure 5:
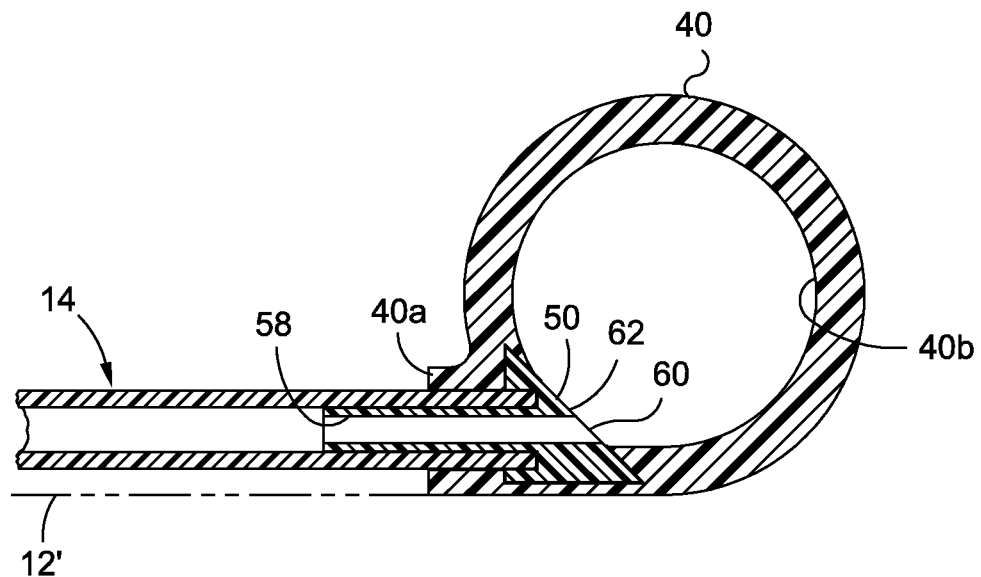
FIG. 5 is also a fragmentary side elevation view in cross section of the solar panel components seen in FIGS. 3, 3A, and 4, and illustrates these components following a next-subsequent manufacturing step.
Figure 7:
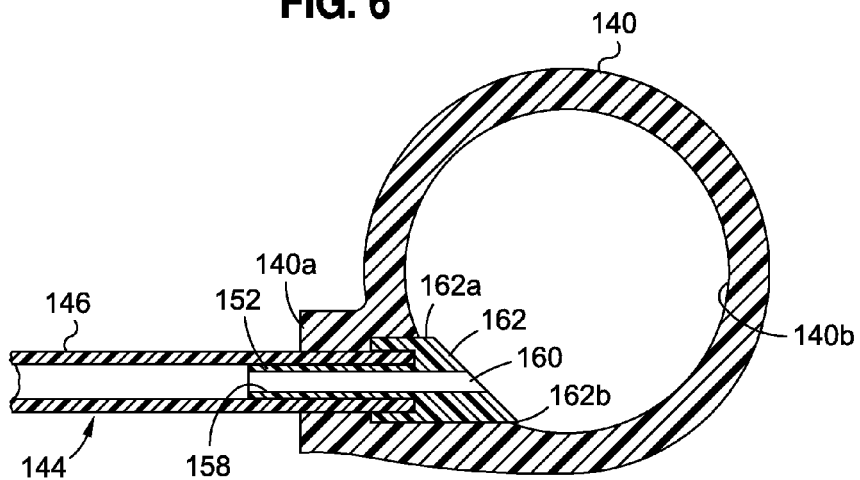

FIG. 7 also provides a fragmentary side elevation view in cross section of the alternative embodiment of inventive solar panel (components of which are seen in Figure, and illustrates these components following a next-subsequent manufacturing step (i.e., equivalent to the manufacturing stage shown in FIG. 5).

Figure 8:
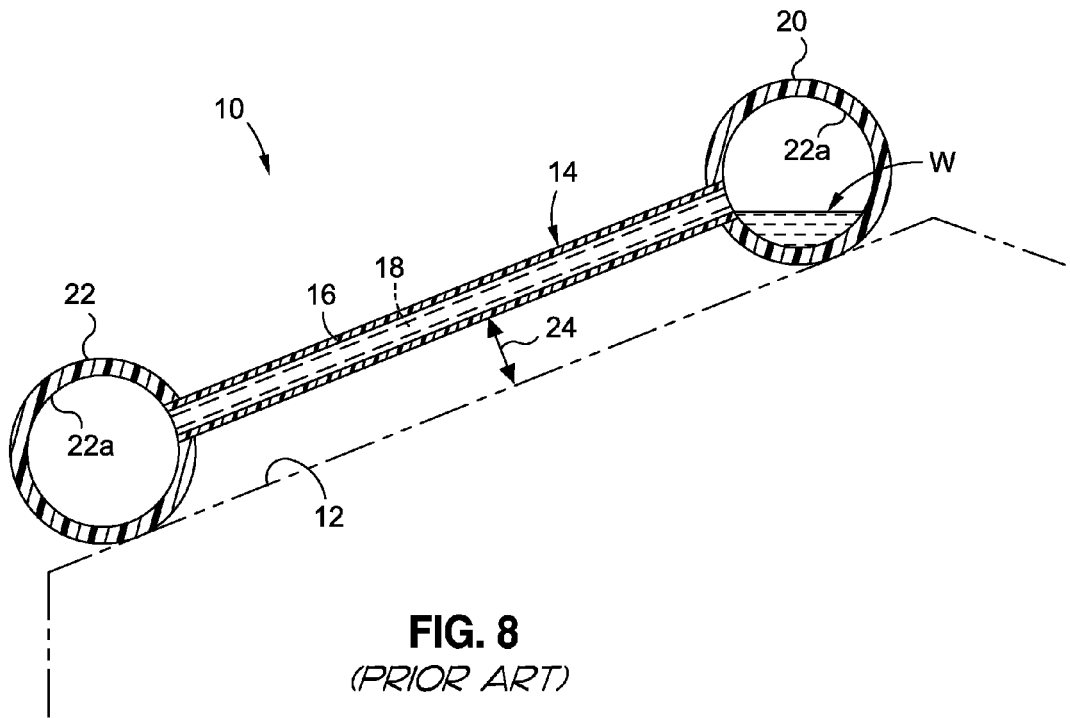

FIG. 8 provides a diagrammatic side elevation and cross sectional view of a "prior art" solar panel.

DETAILED DESCRIPTION OF PREFERRED EXEMPLARY EMBODIMENTS OF THE INVENTION

The following detailed description provides a disclosure of the best currently contemplated mode of carrying out the invention. The description is not to be taken as a limitation on the invention, but is provided merely for the purpose of illustration an exemplary embodiment of the invention which is particularly preferred, and by so doing, to bring forth the general principles of the invention. The spirit and scope of the invention is defined by the appended claims. Steps in the method (or manufacturing process) of making an inventive solar panel according to the present invention are also illustrated.

Figure 1:
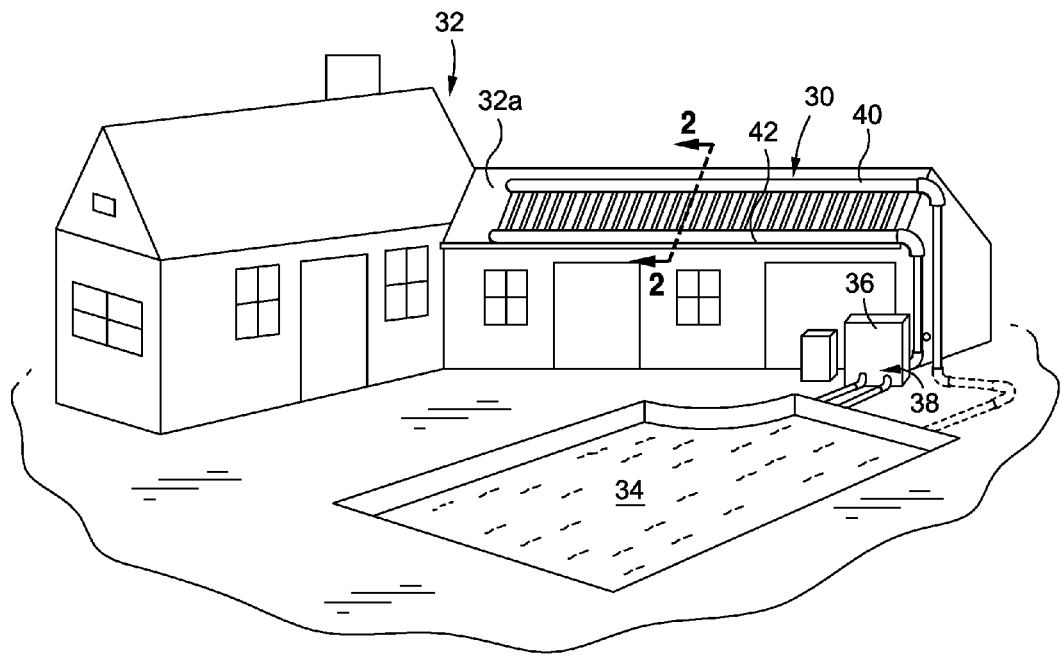
Figure 2:
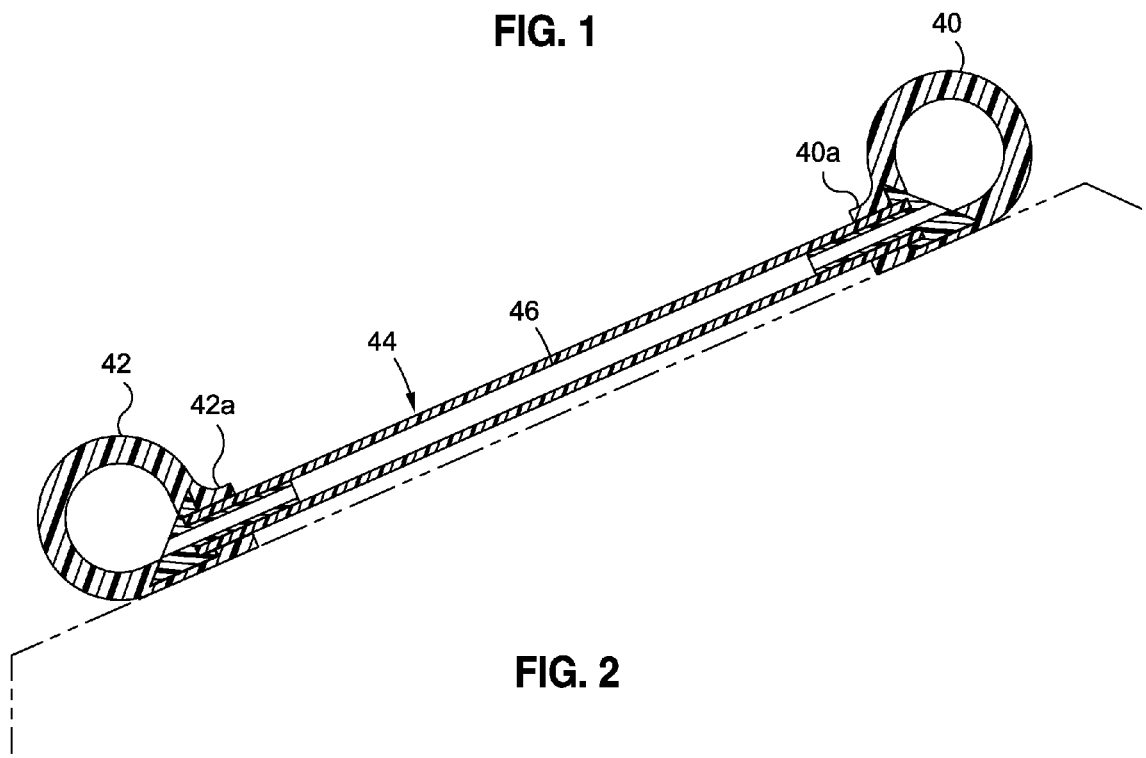

Viewing FIG. 1, an inventive unitary or integral solar panel 30 is installed on a support surface 32a, which may be provided by a rack or by the sloping, sun-exposed roof of a residential building or house 32. The solar panel 30 is most generally sloped and oriented to best expose its sun-absorbing surface area to sunlight. Also, the solar panel 30 is associated in water-flow relation with a swimming pool 34 of this house 32. The swimming pool 34 includes a filter-pump unit 36, which pumps water from the pool, filters this water, and returns the water either directly to the pool, or returns the water (or a portion thereof) to the pool via the solar panel 30, dependent upon the position of a selector valve, indicated by arrowed numeral 38. For this purpose, the solar panel includes a pair of spaced apart generally horizontally extending manifolds 40, 42, (viewing also FIGS. 1, 2, and 5) which are of tubular construction. As is illustrated in FIG. 2, the lower one 42 of these manifold tubes receives relatively cool water from the swimming pool, and the water flows upwardly toward the upper manifold tube 40 via a sheet, mat, or array 44 of plural side-by-side relatively small tubes, each indicated with the numeral 46.

Figure 3:
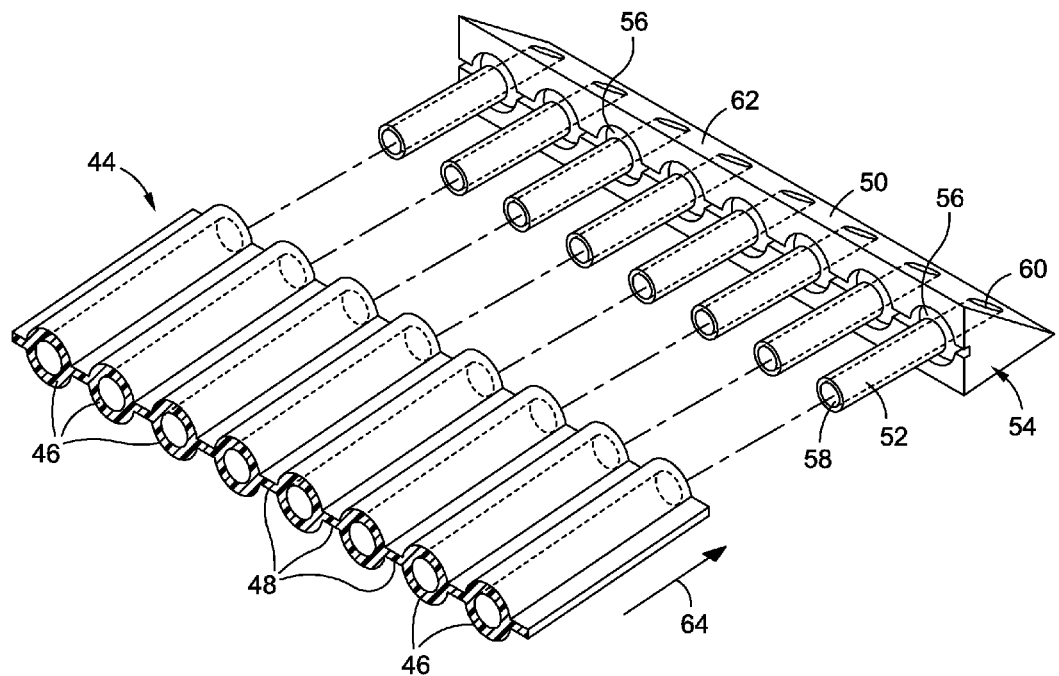
FIG. 3 is a fragmentary exploded perspective view of components of the inventive solar panel, seen preparatory to a manufacturing step in the method of making the present inventive solar panel.
Figure 3A:
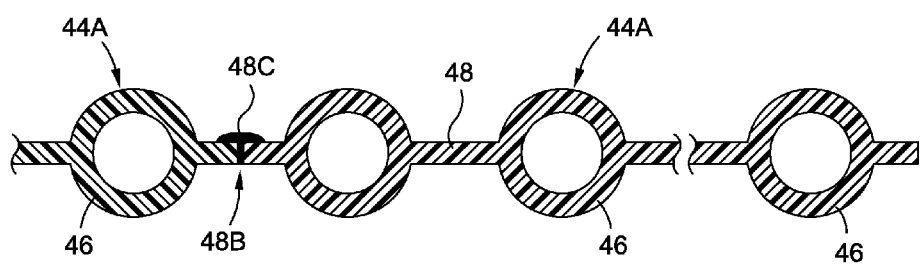
FIG. 3A is a fragmentary cross sectional view showing a manufacturing step preparatory to that shown in FIG. 3.

As is best seen in FIGS. 3 and 3A, the mat 44 includes a plurality of small solar collector tubes 46 formed which are formed as a part of a plastic extrudate or extrusion (i.e., an elongate article made by extrusion of molten plastic through a profiled die followed by cooling of the plastic) including a comparatively thin interconnecting web 48. In use of the solar panel 30, the collector tubes 46 are exposed to and are heated by the sun, and thus they heat pool or spa water flowing inside the mat 44 of multiple tubes 46. As is well understood in the pertinent arts, the thin web 48 unites the tubes 46, but also allows adjacent ones of the plural tubes 46 to be separated (if needed) over a portion of their length in order to, for example, allow the panel to pass around an obstruction on the roof 32a such as a roof vent or stand pipe which may penetrate the roof 32a. This feature (i.e., routing about roof obstructions) of the extruded plastic mat type of low-pressure solar panels is well understood in the pertinent arts.

Viewing now in particular FIGS. 3, 3A, 4, and 5, it is important to note that the manifold tubes 40, 42 outwardly are preferably close to being fully round, but are not fully round because they each include an outwardly extending elongate tangential boss 40a, 42a along a central portion of the length of these manifold tubes. The bosses 40a, 42a are disposed toward one another as is best seen in FIG. 2. Inwardly, the manifold tubes 40, 42 define respective flow passages 40b, 42b, extending along their length (i.e., perpendicular to the plane of the drawing FIG. 5). Accordingly, it will be understood that the manifold tubes 40, 42 are substantially identical to one another, and hereinafter, where a feature of only one is disclosed, the other manifold tube may be taken to also include a corresponding feature. As FIGS. 3, 4, and 5 illustrate, inwardly, the bosses 40a, 42a each house and sealingly embrace, an elongate connector member 50. The connector members 50 include an elongate linear array of parallel hose barb features 52 projecting in parallel from and integral with an elongate molded body 54.

The elongate molded body 54 is triangular in transverse cross section, or in end view cross section as is seen in FIGS. 4 and 5, and on the face thereof defining the hose barbs 52 defines an elongate conformal recess 56 surrounding the array of hose barbs 52, and the function and advantage of which will be described below. Each hose barb 52 defines a through passage 58 opening at an opening 60 defined on an angulated surface 62 defined by the body 54. As is to be further noted by viewing FIGS. 3, 4, and 5, the internal passages 58 of the plural hose barbs 52 open to the internal bores or passages 40b and 42b (respectively) of the manifold tubes 40 and 42. And, this opening of the passages 58 is substantially tangential to the internal passages 40a and 40b of each manifold tube 40, 42.

Viewing FIG. 3A, it is seen that although the mat 44 of plural tubes 46 may be many inches wide (i.e., 40 inches or more wide), the mat 44 is composed of plural individual extrusions 44A, each about 6 to 8 inches wide, for example. The plural tubes 46 of each of the extrusions 44A are united integrally by webs 48 extending between the adjacent tubes 46. And, at the edges of each extrusion, each includes a half-web, indicated with the numeral 48A. In order to unite a number of the extrusions 44A into a mat 44 for a solar panel, the half-webs 48A are abutted (viewing FIG. 3A) with one another forming a butt-joint 48B, and a molten bead 48C of plastic material is applied along the butt-joint 48B thus formed on at least one side in order to plastic-weld the adjacent extrusions 44A. Thus, a mat 44 of sufficient width is built up for use in the solar panel 30.

Once the mat 44 is prepared, as is seen in FIG. 3, the mat and connector member are united (as is illustrated by movement arrow 64 on FIG. 3) to push the respective hose barbs 52 individually into a respective tube 46 of the mat 44. As is seen in FIG. 3, the connector member 50 defines conformal recess 56, which is matchingly shaped so as to closely receive the end portion of the mat 44 (i.e., recess 56 receives both the tubes 46 and webs 48 at the end portion of the mat 44) as this mat is passed onto the hose barbs 50. It will be noted that the conformal recess 54 thus receives and shelters the adjacent end of mat 44 (viewing FIG. 4).

As thus prepared, the mat 44 and connector member 50 are placed into the cavity of an injection molding die (not seen in the drawing Figures), and molten plastic at high pressure is injected into the mold and against a core rod (also not seen in the drawing Figures) in order to integrally form the manifold tube 40 or 42. That is, the manifold tubes 40, 42 are integrally over-molded on the connector member 50 and the end portion of the mat 44. As is seen in FIG. 5, the manifold tube 40 (or 42) embraces, and sealingly surrounds the end portion of the matt 44 and the connector member 50, allowing a portion of surface 62 to be exposed inside of the manifold tube at passage 40b (or 42b).

Preferably, the materials of construction for the panel 30 are selected from the group including polypropylene, polyvinyl chloride, polyethylene, and ABS for the matt 44 and for the manifold tubes 40 and 42. While it is not essential that both the mat 44 and manifold tubes 40, 42 be made of the same material, experience at present indicates that preferably both mat 44 and the manifold tubes 40, 42 are made of the same material. However, because of the high pressure and heat associated with the over-molding process, experience has also shown that a nylon material is best for the connector member 50. This nylon material may be selected from the group including Nylon 6 and Nylon 66. Experience has shown that Nylon 66 is presently the preferred material for making connector member 50. Because none of the materials preferred for the mat 44 and manifold tubes 40, 42 will bond with Nylon 6, or Nylon 66, it will be seen viewing FIG. 5 that while the material of the manifold tube 40 closely embraces and sealingly engages the connector member 50, these parts are not bonded to one another. In contrast, in the boss portion of the manifold tube 40 the material of the manifold tube directly contacts and during the injection molding process (heat and pressure combined) bonds to the material forming the tubes 46 and web 48 of the mat 44. On the other hand, the conformal recess 56 shelters the end of the mat 44, and prevents the material of the manifold tubes 40, 42 from intruding between the mat 44 and the connector member 50 during the over-molding process. Consequently, at the completion of the manufacturing step indicated in FIG. 5, it will be understood that the manifold tube 40 is integral with the matt 44.

When the manifold tube 42 is formed it also will be integral with the mat 44. So, the solar panel 30 when manufacturing is complete is an integral unitary body of mat 44 and manifold tubes 40, 42. Further, because the passages 58 open into the manifold tubes close to or at the bottom surface of the passage 40b, 42b, no significant puddling of water is possible in the manifold tubes 40, 42, which could cause a concern in areas where freezing temperatures are experienced.

FIGS. 6 and 7 are similar in concept to FIGS. 4 and 5, but illustrate an alternative embodiment of solar panel 130. The solar panel 130 of FIGS. 6 and 7 shares many features with the earlier-disclosed embodiment, so distinctions only will be disclosed, with the familiar features not being disclosed in duplication to the extent such can be effected while still providing a complete and enabling disclosure of the embodiment of FIGS. 6 and 7. Accordingly, features of FIGS. 6 and 7 which are the same, or which are analogous in structure or function, to those indicated in the earlier embodiment are referenced on FIGS. 6 and 7 with the same numeral used above, but increased by one-hundred (100) over the prior reference. Turning now to FIGS. 6 and 7, it is seen that the solar panel 130 includes a mat 144 of plural tubes 146 each received at an end portion thereof onto a hose barb 152 of a connector member, and within a conformal recess 156 of this connector member. In contrast to the embodiment depicted, disclosed and described above, however, the body 154 is not triangular in end view or in transverse cross sectional view, but is trapezoidal in shape.

As prepared according to the illustration of FIG. 6, the mat 144 and connector member 150 are placed into the cavity of an injection molding die (not seen in the drawing Figures), and molten plastic at high pressure is injected into the cavity of the mold and against a core rod (also not seen in the drawing Figures) in order to integrally form the manifold tube 140 or 142. That is, the manifold tubes 140, 142 are integrally over-molded on the connector member 150 and the end portion of the mat 144. However, as is best seen in FIG. 7, this present embodiment differs from the first embodiment by having the surface 162 deeper into the bore or passage 140b than was the case with surface 62 in the first embodiment. This deeper intrusion of the connector member 150 into the bore or passage 140b is accomplished by and is the result of the body portion 154 of the connector member 150 being trapezoidal in shape, and by having a recess on the core rod (not seen in the drawing Figures) which receives the protrusion of the connector member 150 during the over molding process. A distinctive difference of this second embodiment over the first embodiment is that the connector member 150 now has corners 162a and 162B, respectively above and below the surface 162, and which are exposed inside of bore 140b. As a result of the core rod receiving and sheltering the protrusion of connector member within bore 140b during the over-molding process, and as a result of the corners 162a and 162b forming a labyrinth type of seal in cooperation with the core rod, flashing or protrusion of the material of the manifold tube 140 between the connector member 140 and possibly across face 162 to possibly obstruct the openings of passages 158 on this face, is prevented. Again, as is seen in FIG. 7, the manifold tube 140 (or 142) embraces, and sealingly surrounds the end portion of the matt 144 and the connector member 150, allowing a portion of surface 162 to be exposed inside of the manifold tube at passage 140b (or 142b).

In view of the above, and in contrast to the conventional solar panel construction seen in prior art FIG. 8, the mat portion of the present inventive solar panel does not define a gap with the supporting roof, not even at or adjacent to the manifolds of the solar panel. This aspect of the present invention can be seen in FIG. 5, where the mat 44 is disposed very close to the dashed line 12'. In contrast to the large gap 24 seen in FIG. 8, there is essentially no gap between a solar panel 30 according to this present invention and the supporting surface upon which the panel is mounted. Additionally, the mat portion of the present solar panel does not have to sag, and thus does not develop the problematical slack that allows conventional solar panels to flap like a flag in a stiff breeze. Also, this feature of the present inventive solar panel means that the panel is much less at risk of damage during installation, because there is no sagging and no partially unsupported portion of the mat, upon which a workman may inadvertently step to damage the solar panel. In fact, if a workman inadvertently does step on the present inventive panel during installation, he is unlikely to do any damage to the panel at all. And finally, the present solar panel drains much more effectively and completely so that it is better protected against ice damage in those areas experiencing freezing weather.

It should be understood, of course, that the foregoing relates merely to exemplary preferred embodiments of the invention, and that modifications or improvements may be made without departing from the spirit and scope of the invention as set forth in the following claims. The following claims provide a definition of the invention.

We claim:

1. An integrally formed low-pressure solar panel for pool/spa water heating, said solar panel comprising:
   an elongate web of plural substantially parallel side-by-side fine dimension solar energy absorber tubes formed of thermoplastic material, said web having a determined transverse cross sectional shape;
   a unitary fluid flow connector member formed of thermoplastic material and including an elongate body which is of a selected shape in end view, and defines a water-exposed face upon which opens plural through flow passages extending angularly relative to said water-exposed face, said connector member also defining a face disposed generally orthogonally to said plural through flow passages, and said orthogonal face defining a conformal recess substantially matching said determined transverse cross sectional shape of said web of absorber tubes, said conformal recess receiving therein an end portion of said elongate web of absorber tubes, and a plurality of linearly arrayed hose barb portions disposed in said conformal recess and extending outwardly there from to each be received individually in a respective one of said plural solar energy absorber tubes of said mat, said plural through passages opening individually on said hose barb portions, and
   a unitary elongate manifold member formed of thermoplastic material and extending generally transverse to said solar energy absorber tubes of said mat, and formed to immerse said connector member and to integrally bond with said mat of plural solar energy absorber tubes by formation of pressurized molten thermoplastic material upon said connector member and absorber tube mat and integrally bonding with said mat of energy absorber tubes, said manifold member defining a transverse primary flow passage extending along and bounded by said water-exposed face of said connector member and defining a center line for said primary flow passage, and said plurality of through passages opening generally tangentially to said primary flow passage and at an alignment spaced from said center line of said primary passage;
   whereby said connector member is entirely embedded and immersed within said manifold member except for said water-exposed face thereof which is exposed within said primary flow passage of said manifold member.

2. A solar panel according to claim 1 wherein said elongate body defines an angulated face exposed within a respective one of said manifold tubes, and said elongate body further being trapezoidal in end view, with said trapezoidal body being immersed in and encompassed by said manifold tube, and said trapezoidal body defining a pair of corners bounding said angulated face, at least one of said corners being exposed within said manifold tube.

3. A solar panel according to claim 2 further including said elongate body being immersed in and encompassed by said manifold tube, said trapezoidal body defining a pair of corners bounding said angulated face, with both of said corners being exposed within said manifold tube, whereby said pair of corners of said elongate body cooperate with a core rod during over-molding of said manifold tube to form a labyrinth seal, preventing material of said manifold tube flashing across said angulated face of said elongate body.

4. A solar panel formed of plastic material and especially configured for heating water at low pressure when exposed to sunlight, said solar panel comprising:
   a planar flexible mat of plural elongate plastic solar collector tubes each having a coextensive first open end and an opposite coextensive second open end, and said plural elongate plastic tubes being interconnected to form said mat by comparatively thin web members interconnecting each tube to a next-adjacent tube;
   a pair of manifold tubes each interconnecting in flow communication with said plural elongate plastic tubes of said mat at respective opposite ends of the latter, each of said pair of manifold tubes outwardly defining a boss providing for interconnection of said mat of plural elongate plastic tubes with the respective one of said pair of manifold tubes, and said mat of plural elongate plastic tubes being disposed below a centerline of at least one of said pair of manifold tubes;
   wherein each of said pair of manifold tubes at said boss thereof includes an integral portion over-molded upon and sealingly engaging with said mat of solar collector tubes;
   further including a molded connector member disposed within said mat of solar collector tubes at an end portion thereof adjacent to a respective one of said pair of manifold tubes, and said connector member also being disposed within said one manifold tube at said boss thereof, and defining a linear array of plural hose barbs each received into a respective one of said solar collector tubes, and said hose barbs each defining a through passage opening within said one manifold tube;
   wherein said connector member further defines a conformal recess about said linear array of plural hose barbs, and said conformal recess receiving and sheltering a proximal end of said mat of solar collector tubes, such that material of said manifold tube does not significantly intrude into said conformal recess during over-molding of said manifold tube;
   wherein said connector member defines a body portion disposed within said manifold tube, and said body portion being triangular in end view such that an angulated face of said triangular body portion is exposed within a bore of said manifold member, and said through passages opening on said angulated face of said body portion to connect said plural solar collector tubes in fluid flow communication with said bore of said manifold tube.

5. A solar panel according to claim 4 wherein each respective one of said pair of manifold tubes is over-molded in integral union with said mat of plural elongate plastic solar collector tubes, so that said plural solar collector tubes of said mat open essentially tangentially to a flow passage defined by said bore of said manifold tubes.

6. A solar panel according to claim 4 wherein said pair of manifold tubes is substantially coextensive with said mat of plural solar collector tubes at one side of said solar panel.

7. A method of providing a solar panel formed of plastic material and especially configured for heating water at low pressure when exposed to sunlight, said method comprising steps of:
   providing an essentially planar and flexible mat consisting of plural elongate plastic solar collector tubes each having a coextensive first open end and an opposite coextensive second open end, and said plural elongate plastic tubes being interconnected by comparatively thin web members interconnecting each solar collector tube to a next-adjacent solar collector tube to form said mat;
   providing a pair of manifold tubes each interconnecting in flow communication with said plural elongate plastic tubes of said mat at respective opposite ends of the latter, providing at least one of said pair of manifold tubes with an outwardly extending boss integrally effecting sealing interconnection of said mat of plural elongate plastic tubes with the respective one of said pair of manifold tubes, and disposing said mat of plural elongate plastic tubes below a centerline of said at least one of said pair of manifold tubes;

including the step of over-molding said pair of manifold tubes into integral union with said mat of plural elongate plastic solar collector tubes;

including the steps of providing a connector member on one side thereof defining a linear array of plural hose barbs, receiving each of said plural hose barbs individually into an end portion of a respective one of said plural solar collector tubes of said mat, providing for said plural hose barbs to extend from the one side of an elongate body, and for said elongate body on the other side thereof to define an angulated face exposed within a respective one of said manifold tubes;

further including the steps of providing said elongate body to be triangular in end view, and for said triangular body to be immersed in and encompassed by said manifold tube, with only said angulated face exposed within said manifold tube.

8. A method according to claim 7 further including the steps of providing said elongate body to be trapezoidal in end view, and for said trapezoidal body to be immersed in and encompassed by said manifold tube, and for said trapezoidal body to define a pair of corners bounding said angulated face, with at least one of said corners being exposed within said manifold tube.

9. A method according to claim 7 further including the steps of providing said elongate body to be trapezoidal in end view, and for said trapezoidal body to be immersed in and encompassed by said manifold tube, and for said trapezoidal body to define a pair of corners bounding said angulated face, with both of said corners being exposed within said manifold tube, whereby said pair of corners of said elongate body cooperate with a core rod during over-molding of said manifold tube to form a labyrinth seal, preventing material of said manifold tube flashing across said angulated face of said elongate body.

* * * * *